(12) United States Patent
Negre et al.

(10) Patent No.: US 6,311,486 B1
(45) Date of Patent: Nov. 6, 2001

(54) METHOD FOR OPERATING A POLLUTION-REDUCING ENGINE

(75) Inventors: Guy Negre, Forum Aurelia, Route du Val, F-83170 Brignoles; Cyril Negre, Brignoles, both of (FR)

(73) Assignee: Guy Negre, Brignoles (FR)

( * ) Notice: Subject to any disclaimer, the term of this patent is extended or adjusted under 35 U.S.C. 154(b) by 0 days.

(21) Appl. No.: 09/202,608
(22) PCT Filed: Jun. 17, 1997
(86) PCT No.: PCT/FR97/01088
§ 371 Date: Sep. 1, 1999
§ 102(e) Date: Sep. 1, 1999
(87) PCT Pub. No.: WO97/48884
PCT Pub. Date: Dec. 24, 1997

(30) Foreign Application Priority Data

Jun. 17, 1996 (FR) .................................................. 96 07714

(51) Int. Cl.$^7$ ........................................................ F01B 29/10
(52) U.S. Cl. .................................................. 60/370; 60/412
(58) Field of Search ............................. 60/39.6, 39.62, 60/370, 407, 409, 410, 412, 414, 415, 417, 419, 712; 123/22; 180/302

(56) References Cited

U.S. PATENT DOCUMENTS

| | | | |
|---|---|---|---|
| 3,847,058 | * | 11/1974 | Manor ..................................... 60/370 |
| 3,885,387 | * | 5/1975 | Simington ............................... 60/370 |
| 3,925,984 | * | 12/1975 | Holleyman .............................. 60/370 |
| 4,018,050 | * | 4/1977 | Murphy .................................. 60/370 |
| 4,102,130 | * | 7/1978 | Stricklin ................................. 60/370 |
| 4,696,158 | * | 9/1987 | DeFrancisco .......................... 60/727 |
| 4,798,053 | * | 1/1989 | Chang .................................... 60/412 |
| 4,896,505 | * | 1/1990 | Holleyman . |
| 5,638,681 | * | 6/1997 | Rapp .................................. 60/39.62 |

FOREIGN PATENT DOCUMENTS

| | | | |
|---|---|---|---|
| 758534 | * | 11/1933 | (FR) . |
| 1009307 | * | 3/1952 | (FR) . |
| 2416344 | * | 8/1979 | (FR) . |

* cited by examiner

*Primary Examiner*—Michael Koczo
(74) *Attorney, Agent, or Firm*—Duane Morris LLP

(57) ABSTRACT

A method for reducing pollution in a mono-mode air-air combustion engine having an intake and compression chamber, connected to a constant volume expansion chamber, which is connected in turn to an expansion and exhaust chamber. External air is drawn into the intake chamber and compressed to an increased pressure and temperature. The compressed air is transferred to the constant volume expansion chamber, wherein additional, ambient temperature, compressed air is injected therein. The injected air, when contacting the elevated pressure and temperature of the compressed air causes an expansion of the air within the constant volume expansion chamber. The energy associated with the air expansion is transferred to the expansion and exhaust chamber, wherein the continued compressed air expansion produces a work force that is imparted to a piston. The energy depleted air is then exhausted through an exhaust value.

16 Claims, 1 Drawing Sheet

METHOD FOR OPERATING A POLLUTION-REDUCING ENGINE

FIELD OF THE INVENTION

The invention relates to internal combustion engine. More specifically, a method for a pollution-reducing engine with an independent expansion chamber.

BACKGROUND OF THE INVENTION

In urban and suburban areas, public transport is very often provided by urban buses propelled by conventional engines, which are usually diesel engines that employ a heterogeneous mixture, e.g., diesel fuel, which are particularly polluting. Attempts at making these vehicles run on fuels said to be less polluting (LPG, etc.) have been made, but the results in terms of pollution are particularly weak.

A method for reducing pollution of an engine with an independent external combustion chamber, has described, in the inventor's French patent application, recorded under national record number 95/02838, in which method, the air-fuel mixture is drawn into and compressed in an independent intake and compression chamber then transferred (still under pressure) into the independent combustion chamber to be ignited therein, either using a spark in the case of an engine with a homogenous mixture, or by self-ignition in the case of a diesel engine with a heterogeneous mixture, in order to increase the temperature and pressure of the said mixture which, following the opening of a transfer connecting the said independent combustion chamber to an expansion and exhaust chamber (it too independent), will be expanded in the latter chamber in order to produce work therein, then exhausted to the atmosphere through an exhaust pipe, in which method, when operating in town (or at low power), the fuel injector is no longer operated and, in this case, there is introduced into the combustion chamber, somewhat after the fuel-free compressed air from the intake and compression chamber has been let into the latter, a small amount of additional compressed air from an external reservoir where the compressed air is stored at very high pressure. This small amount of compressed air at ambient temperature will heat up upon contact with the mass of hot air contained in the combustion chamber, and will expand so as to increase the pressure in the combustion chamber to allow work to be delivered during expansion. This engine thus employs a dual-mode or dual-energy operation.

There is a need for an engine, especially for the urban markets, that use less fuel and aid in reducing the pollution caused by other vehicles using conventional internal combustion engines.

SUMMARY OF THE INVENTION

The method of a pollution-reducing engine and its installation in urban buses, for example, makes it possible to eliminate emissions of polluting gases but also allows pollution to be removed partially and considerably from the air in the town.

It is characterized by the means employed, and more particularly by the elimination of the fuel circuit of the engine in favor of simply having mono-mode operation with the injection of additional compressed air, and by fitting upstream of the air intake into the intake an compression chamber of the engine, one or more charcoal filters or any other filtering and purification method, such as molecular sieves, chemical methods or the like, not only allowing dust and other pollutants to be halted, but also allowing the air let into the engine to be purified and pollution removed therefrom.

The additional compressed air stored at very high pressure in the reservoirs of the vehicle is filtered and purified through charcoal filters or the like before being compressed, the ambient air (polluted by the other vehicle) drawn in by the engine into the intake and compression chamber is filtered and purified through the charcoal filter or filters (or any other method that allows it the be purified): it is therefore clear that the air expanded and exhausted through the exhaust is still filtered and purified. Furthermore, as the mode of running the engine on traditional fuel has been eliminated, there can no longer remain in the chamber any particles or other residue originating from a prior combustion.

Other objects, advantages and features of the invention will become clear from reading the non-limiting description of one embodiment of the invention, this being given with reference to the appended drawing.

DETAILED DESCRIPTION OF THE INVENTION

Figure 1:
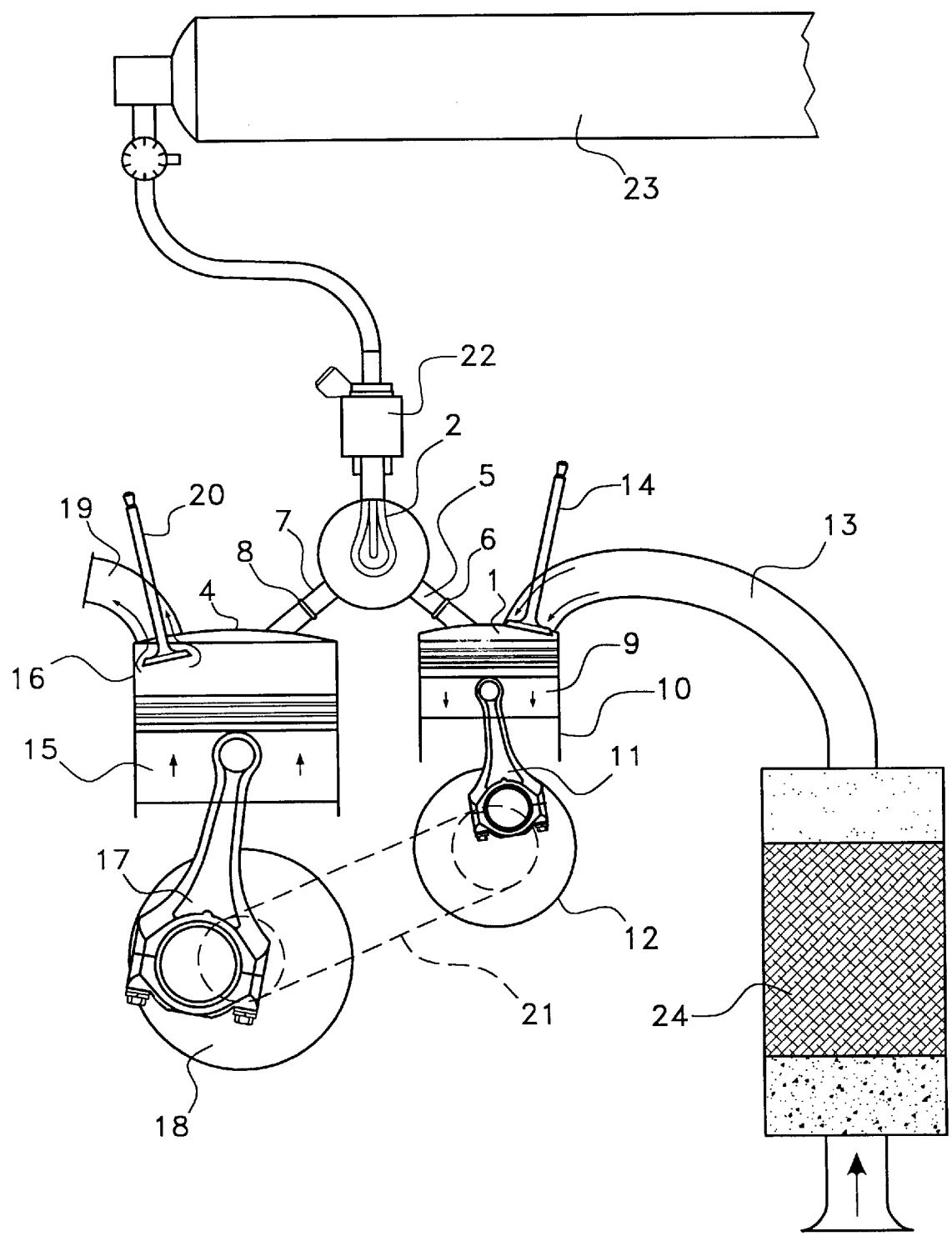
FIG. 1 depicts, diagrammatically, and in cross section, one embodiment of the engine according to the invention.

Referring to FIG. 1, there is shown intake and compression chamber 1, the constant-volume expansion chamber 2 in which there is fitted an injector 22 for additional compressed air, this injector being fed with compressed air stored in a very high pressure reservoir 23 and the expansion and exhaust chamber 4. The intake and compression chamber 1 connected to the expansion chamber 2 by a port 5, the opening and closing of which are controlled by a leaktight shutter 6. The expansion chamber 2 is connected to the expansion and exhaust chamber 4 by a port or transfer 7 the opening and closing of which is controlled by a leaktight shutter 8.

The intake and compression chamber 1 is fed with air via an intake port 13, the opening of which is controlled by a valve 14, and upstream of which is installed a pollution-removing charcoal filter 24. The intake and compression chamber 1 operates like a reciprocating-compressor unit in which a piston 9 sliding in a cylinder 10 is controlled by a connecting rod 11 and a crankshaft 12. The expansion and exhaust chamber 4 controls a conventional piston-engine unit with a piston 15 sliding a cylinder 16 which, via a connecting rod 17, rotates a crankshaft 18. The expanded air is exhausted through an exhaust port 19, the opening of which is controlled by a valve 20. The rotation of the crankshaft 12 of the intake and compression chamber 1 is brought about, through a mechanical link 21, by the motive-power crankshaft 18 of the expansion and exhaust chamber 4. The engine is depicted at a time when the air which has been purified and had pollution removed from it through the charcoal filter 24 has been drawn into compressed in the expansion chamber 2 during the induction-compression cycle performed by the piston/connecting-rod/crank unit (9,10,11) and the port 5 has been closed by the leaktight shutter 6. The air, from which pollution has been removed, which has been purified and which has been compressed in the expansion chamber 2 is therefore at a high temperature (several hundred degrees depending on the compression ratios chosen) and the injector 22 of additional compressed air is then operated and lets in a small amount of compressed air at ambient temperature which is expanded to a pressure somewhat higher than the pressure in the expansion chamber 2 so as to allow it to enter the chamber; this small amount of compressed air will heat up on contact with the high-temperature mass of air contained in the expansion chamber, will expand and increase the pressure so as to produce work as it expands, this expansion being brought about when the piston of the expansion chamber 15 reaches top dead center, by opening the transfer duct 7 controlled by the leaktight shutter 8. Expansion occurs with hot air until the expansion piston 15 that drives the motor-power crankshaft 18 reaches bottom dead center, and the expanded, pollution-free and purified air is then exhausted to the atmosphere through the exhaust pipe 19 the value 20 being open while the piston 15 of the expansion and exhaust chamber 4 is on its up-stroke.

The methods used to filter the air let into the engine according to the invention, e.g., charcoal filters, molecular sieves, micrometric sieves, chemical methods, etc., and the number of filters used can vary without altering the principles of the invention, just as a unit made up of an intake and compression chamber, a combustion chamber, and an expansion and exhaust chamber, which represents an operating element, can be duplicated following the example of conventional multi-cylinder engines.

The engine method according to the invention can be applied to all vehicles, but it requires a large amount of additional compressed air and relatively large storage reservoirs on board the vehicle. It is particularly attractive when installed on urban buses on account, on the one hand, of the large amount of air drawn in by the engine, which therefore allows pollution to be removed from substantial volumes and, on the other hand, of the possibility of installing large-capacity reservoirs of additional compressed air on the bus and because, incidentally, as buses make numerous stops, it is possible for the reservoir or reservoirs of additional compressed air installed on the vehicle to be refilled more often by installing filling stations at the bus stops or at the depot. The same is true of service vehicles such as taxis or small vans operating in an urban environment.

What is claimed is:

1. A method for operating an air-air mono-mode pollution reducing engine comprising an independent intake and compression chamber which is connected via a transfer to a constant volume expansion chamber connected to an expansion and exhaust chamber, said expansion and exhaust chamber hang an exhaust port contained therein, and a reservoir for air at a very high pressure and an injector connected to said constant volume expansion chamber, said intake and compression chamber and said expansion and exhaust chamber having a piston therein connected to a respective crankshaft and a linkage between said crankshafts, said method comprising the steps of:

drawing air into said intake and compression chamber;

compressing said air drawn into said intake and compression chamber to an increased pressure and temperature;

transferring said compressed air having increased pressure and temperature to said constant volume expansion chamber;

injecting additional air at ambient temperature from said reservoir into said constant volume expansion chamber with said compressed air;

opening the transfer leading from said constant volume expansion chamber to said expansion and exhaust chamber thus producing work within said expansion and exhaust chamber by allowing said compressed air and injected air to expand into said expansion and exhaust chamber; and exhausting said compressed and injected air out of said engine; wherein, no fuel is introduced into said engine.

2. The method of claim 1, wherein said additional air injected into said constant volume expansion chamber is injected at ambient temperature.

3. The method of claim 1, wherein said drawn air is filtered prior to entering said intake and compression chamber.

4. The method of claim 1, wherein said step of compressing is dependent upon said physical work produced.

5. The method of claim 1, further comprising the step of recharging said reservoir.

6. A method for operating an engine comprising an intake and compression chamber, a constant volume expansion chamber coupled to said intake and compression chamber, an expansion and exhaust chamber coupled to said constant volume expansion chamber, and a reservoir coupled to said constant volume expansion chamber, said intake and compression chamber and said expansion and exhaust chamber having a piston therein connected to a respective crankshaft and a linkage between said crankshafts, said method comprising the step of:

drawing air into said intake and compression chamber;

compressing said air drawn into said intake and compression chamber thus raising it to an elevated pressure and temperature;

transferring said compressed air into said constant volume expansion chamber at said elevated pressure and temperature;

injecting additional air into said constant volume expansion chamber from said reservoir, thus further increasing said elevated temperature and pressure of said compressed air;

allowing said compressed air to expand in said expansion and exhaust chamber thus performing physical work; and exhausting said compressed and injected air out of said engine, wherein, no fuel is supplied to said engine.

7. The method of claim 6, wherein said additional air injected into said constant volume expansion chamber is injected at ambient temperature.

8. The method of claim 6, wherein said drawn air is filtered prior to entering said intake and compression chamber.

9. The method of claim 6, wherein said step of compressing is dependent upon said physical work produced.

10. The method of claim 6, further comprising the step of recharging said reservoir.

11. A method for operating an air-fuel/air-air dual-mode dual-energy reducing engine without using fuel, the dual-mode dual-energy engine comprising an independent intake and compression chamber connected via a transfer to an expansion and exhaust chamber, an exhaust port, a reservoir for high pressure air and an air injector, said intake and compression chamber and said expansion and exhaust chamber having a piston therein connected to a respective crankshaft and a linkage between said crankshafts, said method comprising the steps of:

drawing air into said intake and compression chamber;

compressing said air drawn into said intake and compression chamber thus raising it to an elevated pressure and temperature;

tansferring said compressed air into a constant volume expansion chamber at said elevated pressure and temperature;

injecting additional air into said constant volume expansion chamber from said reservoir, thus further increasing said elevated temperature and pressure of said compressed air;

allowing said compressed air to expand in said expansion and exhaust chamber thus performing physical work; and exhausting said compressed and injected air out of said engine; wherein no fuel is supplied to said engine.

12. The method of claim 11, wherein said additional air injected into said constant volume expansion chamber is injected at ambient temperature.

13. The method of claim 11, wherein said drawn air is filtered prior to entering said intake and compression chamber.

14. The method of claim 11, wherein said step of compressing is dependent upon said physical work produced.

15. The method of claim 11, further comprising the step of recharging said reservoir.

16. The method of claim 11, wherein said compressed air and said injected air are fuel-free.

* * * * *